(12) United States Patent
Tsubokura et al.

(10) Patent No.: US 7,916,239 B2
(45) Date of Patent: Mar. 29, 2011

(54) LIQUID CRYSTAL DISPLAY DEVICE

(75) Inventors: Masaki Tsubokura, Mobara (JP); Shimon Itakura, Mobara (JP)

(73) Assignees: Hitachi Displays, Ltd., Chiba (JP); IPS Alpha Technology, Ltd., Chiba (JP)

( * ) Notice: Subject to any disclaimer, the term of this patent is extended or adjusted under 35 U.S.C. 154(b) by 225 days.

(21) Appl. No.: 12/255,680

(22) Filed: Oct. 22, 2008

(65) Prior Publication Data

US 2009/0109374 A1   Apr. 30, 2009

(30) Foreign Application Priority Data

Oct. 25, 2007   (JP) ................................. 2007-277425

(51) Int. Cl.
    *G02F 1/1333*   (2006.01)
(52) U.S. Cl. .......................................................... 349/58
(58) Field of Classification Search ........................ None
    See application file for complete search history.

(56) References Cited

U.S. PATENT DOCUMENTS

| | | | | |
|---|---|---|---|---|
| 7,070,313 B2* | 7/2006 | Kim et al. | ...................... | 362/561 |
| 7,461,958 B2* | 12/2008 | Takata et al. | .................. | 362/433 |
| 7,510,317 B2* | 3/2009 | Murakami et al. | ............ | 362/634 |
| 7,540,650 B2* | 6/2009 | Azuma et al. | .................. | 362/634 |
| 7,658,534 B2* | 2/2010 | Azuma et al. | .................. | 362/634 |
| 2004/0257792 A1* | 12/2004 | Yu et al. | .......................... | 362/31 |
| 2008/0291367 A1* | 11/2008 | Ota et al. | ......................... | 349/70 |
| 2009/0268126 A1* | 10/2009 | Son et al. | ......................... | 349/62 |
| 2010/0014017 A1* | 1/2010 | Sato et al. | ....................... | 349/58 |

FOREIGN PATENT DOCUMENTS

| | | |
|---|---|---|
| JP | 2004-327449 | 11/2004 |
| JP | 2006-286341 | 10/2006 |

* cited by examiner

*Primary Examiner* — Sung H Pak
(74) *Attorney, Agent, or Firm* — Antonelli, Terry, Stout & Kraus, LLP.

(57) ABSTRACT

To provide a liquid crystal display device where supports for fluorescent lamps can be prevented from vibrating without affecting the ease of attachment of the supports for fluorescent lamps to the frame for the backlight.

A liquid crystal display device having: a liquid crystal display panel; and a backlight having a light source for illuminating the liquid crystal display panel is characterized in that said backlight comprises at least a number of fluorescent lamps in rod form aligned in a plane facing said liquid crystal display panel, supports for fluorescent lamps for supporting the fluorescent lamps in rod form, and a frame to which the supports for fluorescent lamps are secured, and said supports for fluorescent lamps have an engaging portion for insertion into a hole created in said frame and the surface of said supports for fluorescent lamps where said engaging portion is formed has protrusions.

8 Claims, 12 Drawing Sheets

LIQUID CRYSTAL DISPLAY DEVICE

The present application claims priority over Japanese Application JP 2007-277425 filed on Oct. 25, 2007, the contents of which are hereby incorporated into this application by reference.

BACKGROUND OF THE INVENTION (1) Field of the Invention

The present invention relates to a liquid crystal display device, and in particular, to a liquid crystal display device having a so-called direct type backlight.

(2) Related Art Statement

Liquid crystal display devices use a so-called direct type backlight for large-scale liquid crystal display panels.

Light sources used in such backlights include cold cathode fluorescent lamps, external electrode fluorescent lamps and a number of aligned LED's.

From among these, light sources in rod form (lines), such as cold cathode fluorescent lamps and external electrode fluorescent lamps, are currently the mainstream. These can be provided by aligning fluorescent lamps which can be controlled, and thus are easy to assemble and widely in use.

These fluorescent lamps are formed in such a manner that the electrodes at the two ends are secured to a frame for the backlight.

In addition, as liquid crystal display devices have been increasing in size in recent years, longer fluorescent lamps have come into use, and thus, structures for supporting such fluorescent lamps are becoming necessary.

Therefore, fluorescent lamps provided with a support for a fluorescent lamp in a portion of the lamp where no electrodes are formed in order to secure the lamp to the frame for the backlight have become better known.

Here, the support for a fluorescent lamp is secured to the frame by means of an engaging portion inserted into a hole created in the frame for the backlight, and thus, the above described engaging portion is formed so that it returns to its original form after being inserted into the above described hole so as to be engaged with the frame around the above described hole.

Such liquid crystal display devices are disclosed in the following Patent Document 1 and Patent Document 2, for example.

(Patent Document 1) Japanese Unexamined Patent Publication 2004-327449

(Patent Document 2) Japanese Unexamined Patent Publication 2006-286341

SUMMARY OF THE INVENTION

Problem to be Solved by the Invention

In the case where such a liquid crystal display device is assembled in a housing together with speakers in order to form a television receiver, for example, noise is generated in addition to sounds from the speakers.

After searching for the cause of the noise, the present inventors found that there is in some cases backlash between the engaging portion and the above described frame in the supports for fluorescent lamps attached to the frame for the backlight, and sound coming from the above described speakers resonates in the supports for fluorescent lamps, and as a result, noise is generated, as described above.

As a measure against this, it is possible to design the engaging portion so that the clearance (space) in the assembly which causes backlash in the above described supports for fluorescent lamps in the above described frame is smaller. In this case, however, ease of attachment of the supports for fluorescent lamps to the above described frame (the ease of assembly) is much worse, and therefore, another measure is required.

An object of the present invention is to provide a liquid crystal display device where the supports for fluorescent lamps can be prevented from vibrating without affecting the ease of attachment of the supports for fluorescent lamps to the frame for the backlight.

Means for Solving Problem

The gist of typical inventions from among the inventions disclosed in the present specification is briefly described in the following.

The liquid crystal display device according to the present invention has: a liquid crystal display panel; and a backlight having a light source for illuminating the liquid crystal display panel, and is characterized in that the above described backlight comprises at least a number of fluorescent lamps in rod form aligned in a plane facing the above described liquid crystal display panel, supports for fluorescent lamps for supporting the fluorescent lamps in rod form, and a frame to which the supports for fluorescent lamps are secured, and the above described supports for fluorescent lamps have an engaging portion for insertion into a hole created in the above described frame and the surface of the above described supports for fluorescent lamps where the above described engaging portion is formed has protrusions.

In addition, the liquid crystal display device according to the present invention has: a liquid crystal display panel; and a backlight having a light source for illuminating the liquid crystal display panel, and is characterized in that the above described backlight comprises at least a number of fluorescent lamps in rod form aligned in a plane facing the above described liquid crystal display panel, supports for fluorescent lamps for supporting the fluorescent lamps in rod form, a frame to which the supports for fluorescent lamps are secured, and the above described supports for fluorescent lamps have an engaging portion for insertion into a hole created in the above described frame, and a cushioning material intervenes between the above described supports for fluorescent lamps and the above described frame.

Furthermore, the liquid crystal display device according to the present invention has: a liquid crystal display panel; and a backlight having a light source for illuminating the liquid crystal display panel, and is characterized in that the above described backlight comprises at least a number of fluorescent lamps in rod form aligned in a plane facing the above described liquid crystal display panel, supports for fluorescent lamps for supporting the fluorescent lamps in rod form, and a frame to which the supports for fluorescent lamps are secured, the above described supports for fluorescent lamps have an engaging portion for insertion into a hole created in the above described frame, and protrusions are formed on the surface facing the above described supports for fluorescent lamps in the above described frame.

Here, the present invention is not limited to the above described configuration, and various modifications are possible, as long as the technical idea of the present invention is not deviated from.

EFFECTS OF THE INVENTION

According to these liquid crystal display devices, the supports for fluorescent lamps can be prevented from vibrating without affecting the ease of attachment of the supports of fluorescent lamps to the frame for the backlight.

EXPLANATION OF SYMBOLS

PNL . . . liquid crystal display panel
OS . . . optical sheet
BL . . . backlight
SUB1S, UB2 . . . substrates
SCD . . . semiconductor device
EFL . . . external electrode fluorescent lamp
LSS . . . support for fluorescent lamp
OSP . . . support pole for optical sheet
BS . . . substrate
SS . . . base
LSM . . . material for supporting fluorescent lamp
RR . . . engaging portion
BM . . . substrate
RM . . . engaging material
PJ . . . protrusion
CM . . . cushioning material

DETAILED DESCRIPTION OF THE INVENTION

Best Mode for Carrying Out the Invention

In the following, the liquid crystal display devices according to the embodiments of the present invention are described in reference to the drawings.

First Embodiment

Configuration of Entirety

Figure 2:
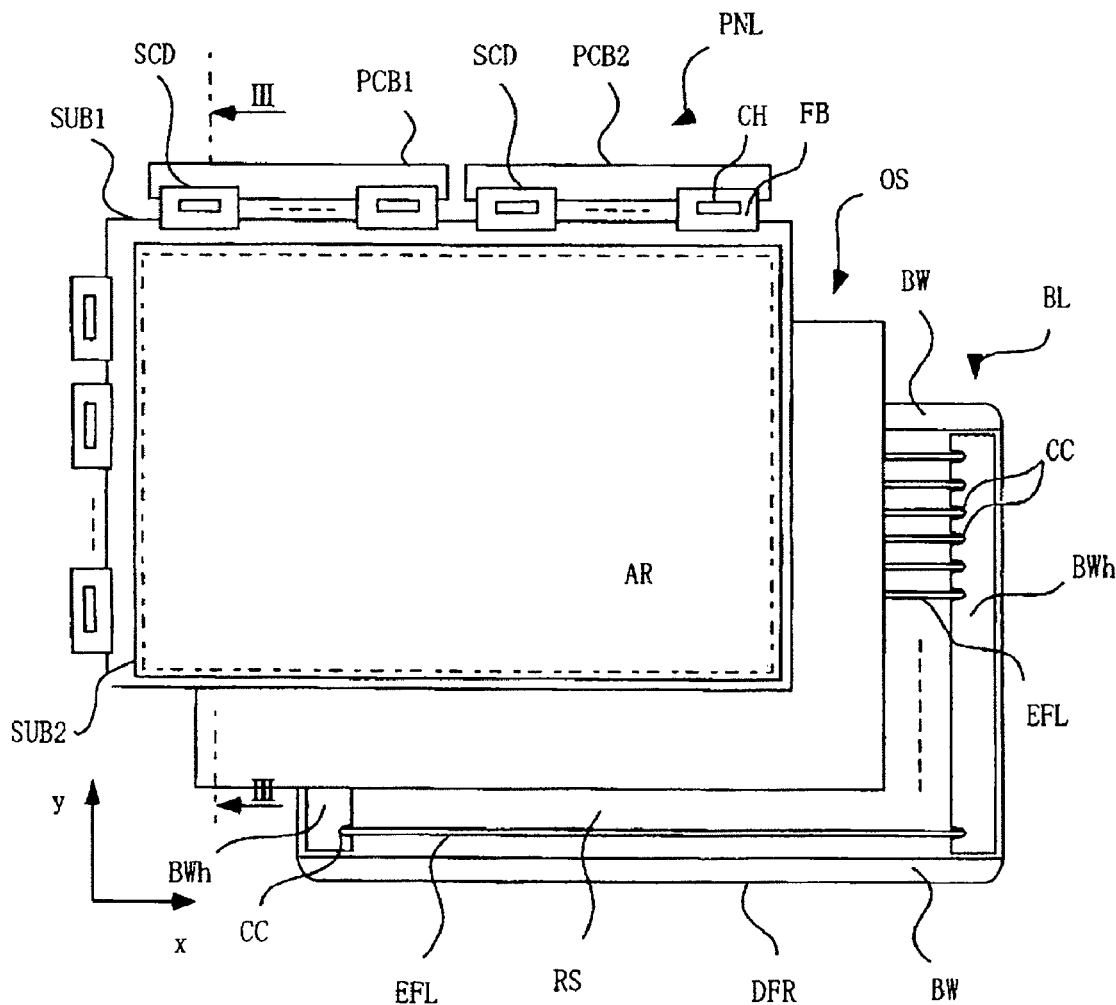
FIG. 2 is a schematic plan diagram showing the liquid crystal display device according to one embodiment of the present invention.

FIG. 2 is a schematic diagram showing the configuration of the liquid crystal display device according to one embodiment of the present invention.

First, a liquid crystal display panel PNL, an optical sheet OS and a backlight BL are provided in this order from the viewer side.

The liquid crystal display panel PNL is formed of a pair of substrates SUB1 and SUB2 made of glass, for example, provided in parallel as outer walls, and liquid crystal which intervenes between these substrates SUB1 and SUB2.

Pixels are arranged in a matrix (not shown) on the liquid crystal side of one of the above described substrates SUB1 and SUB2 with the above described liquid crystal as one component, so that the pixels can control the light transmittance of the liquid crystal.

In addition, the region where pixels are formed is used as a liquid crystal display region AR (region surrounded by single-dot chain line in figure), and the entirety of the liquid crystal display region AR is illuminated with light from the below described backlight BL, so that the viewer can see an image when light transmits through the pixels.

The substrate SUB1, which is provided to the rear relative to the viewer side, has portions which are exposed from the substrate SUB2 along the left and top side in the figure, for example, and one side of a number of semiconductor devices SCD is connected to these portions. These semiconductor devices SCD are formed of so-called tape carrier type semiconductor devices, for example, where semiconductor chips are mounted on the upper surface of the flexible substrates FB, where wires are formed.

The semiconductor devices SCD are formed of circuits for independently driving the above described pixels. Printed circuit boards PCB1 and PCB2 are connected along the other side of the semiconductor devices SCD (video signal driving circuits) aligned in the direction x in the figure from among the semiconductor devices SCD, which faces the side to which the above described substrate SUB 1 is connected, so that an external input signal can be inputted from the controller, not shown, via the printed circuit boards PCB1 and PCB2. The liquid crystal display device according to the present embodiment is large-scale, and the two printed circuit boards PCB1 and PCB2 are provided side by side in the configuration.

In addition, an external input signal is inputted into the semiconductor devices SCD (scanning signal driving circuits) provided in the direction y in the figure from among the above described semiconductor devices SCD via wires (not shown) formed on the surface of the substrate SUB1, and therefore, no printed circuit boards corresponding to the above described printed circuit boards PCB1 and PCB2 are connected in the configuration.

In addition, a backlight BL is provided on the rear of the liquid crystal display panel PNL via a diffusion sheet, a prism sheet or an optical sheet OS made of a multilayer body of these, for example. The optical sheet OS diffuses or collects light from the backlight BL so that light is guided to the liquid crystal display panel PNL side.

Figure 3:
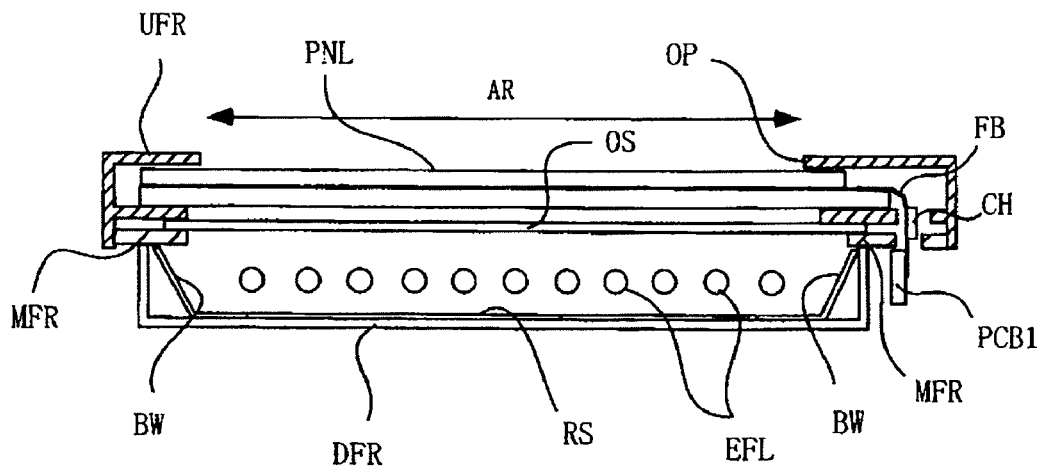
FIG. 3 is a cross sectional diagram along line III-III in FIG. 2.

The backlight BL is of a so-called direct type, and has a number of fluorescent lamps aligned in the direction y in the figure with the longitudinal direction coinciding with the direction x in the figure within a plane parallel to the liquid crystal display panel PNL (the present embodiment shows external electrode fluorescent lamps EFL as an example), so that the external electrode fluorescent lamps EFL are supported by a lower frame DFR formed of a metal, for example, so as to be in box form (see FIG. 3). In this specification, the above described lower frame DFR may be referred to as frame for a backlight.

A reflective sheet RS is mounted on the surface of the lower frame DFR, and side wall surfaces BW made of the raised edges are formed along the sides on the top and bottom of the reflective sheet RS, which extend in the direction x in the figure (see FIG. 3).

Here, side wall plates BWh made of a resin material, for example, are provided on the right side and the left side, which extend in the direction y in the figure of the lower frame BFR, so as to be inclined in such a manner that the outer side is higher, and the side wall plates cover the electrodes on the two sides of the above described external electrode fluorescent lamps EFL. Notches CC for avoiding interference with the external electrode fluorescent lamps EFL are created along the lower sides of the side wall plates BWh.

These side wall plates BWh function to reflect light from the surface on the above described liquid crystal panel PNL side, and form a substantial side wall portion of the backlight BL together with the side wall surface BW of the above described reflective sheet RS. The configuration of the backlight BL is described in further detail below.

<Configuration of Module>

In addition, the liquid crystal display panel PNL, the optical sheet OS and the backlight BL are enclosed by an upper frame UFR and a middle frame MFR which are respectively secured to the above described lower frame DFR, and shown in FIG. 3, so that these frames form the liquid crystal display device as a module. Here, FIG. 3 is a cross sectional diagram along line III-III in FIG. 2.

An opening OP for exposing at least the liquid crystal display region AR of the liquid crystal display panel PNL is formed in the upper frame UFR on the viewer side.

The semiconductor devices SCD connected to the substrate SUB1 of the liquid crystal display panel PNL are bent in such a manner that the end of the flexible substrate FB connected to the printed circuit boards PCB1 and PCB2 is bent to a right angle. This is in order to make the frame of the liquid crystal display device narrower.

Here, FIG. 3 does not show the supports for fluorescent lamps described in detail below (denoted by symbol LSS below).

<Backlight BL>

Figure 4A:
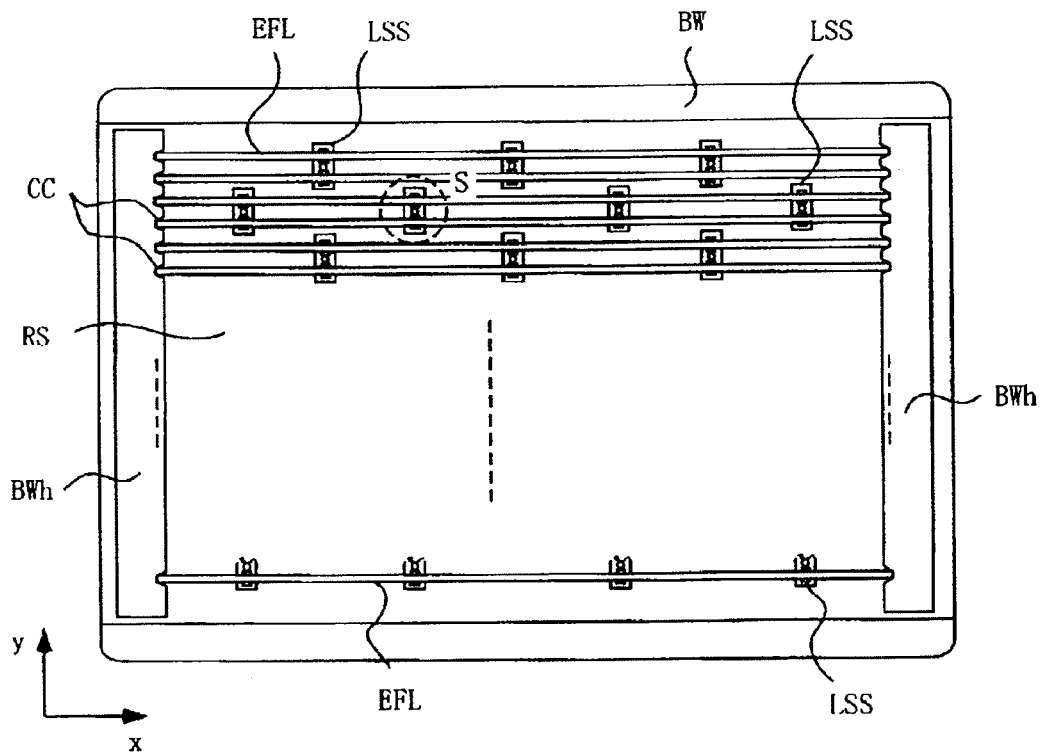
FIGS. 4(a) and 4(b) are diagrams showing the configuration of a backlight used in the liquid crystal display device according to one embodiment of the present invention.

FIG. 4(a) is a diagram showing an enlargement of only the above described backlight BL shown in FIG. 2. FIG. 4(a) shows supports for fluorescent lamps LSS which are not shown in FIG. 2.

The supports for fluorescent lamps LSS are secured to the lower frame DFR and provided so as to support the tube portion of the external electrode fluorescent lamps EFL.

Figure 4B:
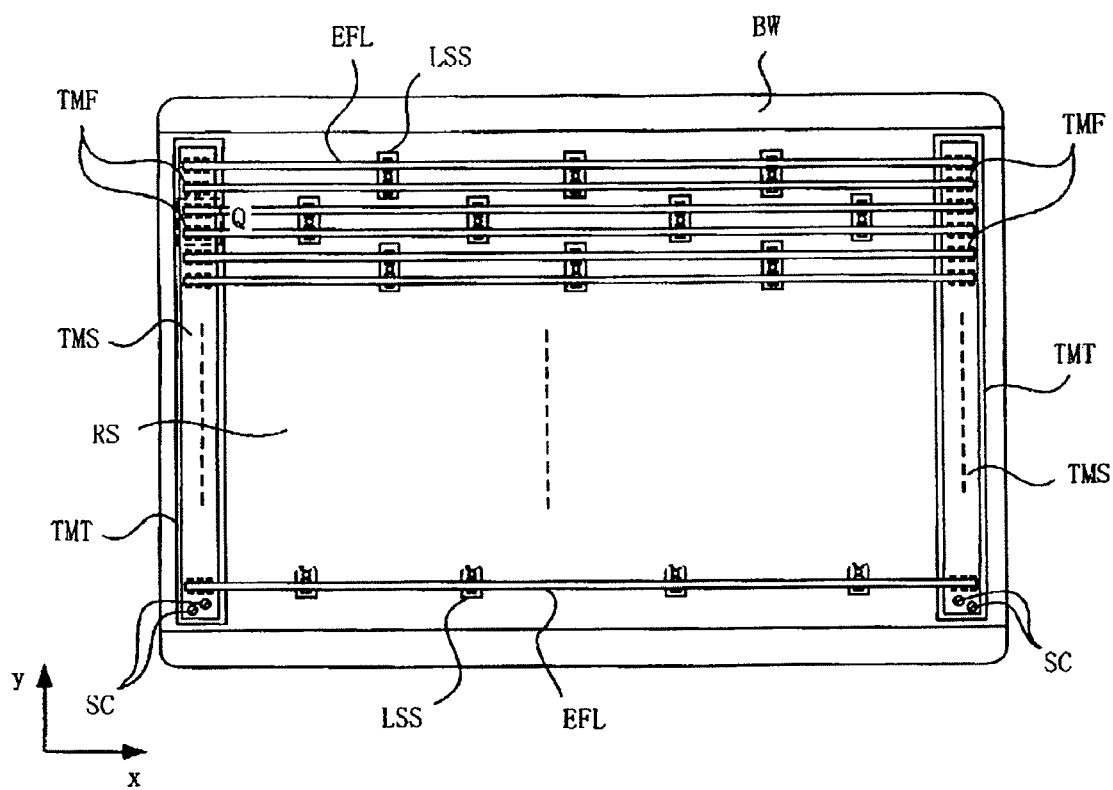

The external electrode fluorescent lamps EFL are supported by the lower frame DFR via the electrode fixtures TMF (see FIG. 4(b)) in the electrode portions at the two ends. As liquid crystal display devices become large-scale, long external electrode fluorescent lamps EFL cannot be sufficiently supported only by electrode portions, and therefore, supports for fluorescent lamps LSS are provided, as described above, in order to support the tube portion, which is the middle portion of the fluorescent lamps.

The embodiment shown in FIG. 4(a) is formed so that one support for fluorescent lamps LSS can support two external electrode fluorescent lamps LSS provided side-by-side, for example, and a number of supports for fluorescent lamps EFL are aligned in the longitudinal direction of the external electrode fluorescent lamps EFL at equal intervals, for example.

In addition, two other external electrode fluorescent lamps EFL adjacent to the above described two external electrode fluorescent lamps EFL are also support by a number of supports for fluorescent lamps LSS in the longitudinal direction, and these supports for fluorescent lamps LSS are staggered relative to the supports for fluorescent lamps LSS for supporting the above described two external electrode fluorescent lamps EFL. When the supports for fluorescent lamps LSS are aligned, the brightness lowers in these portions, and therefore, they are staggered, in order to prevent this.

Figure 5:
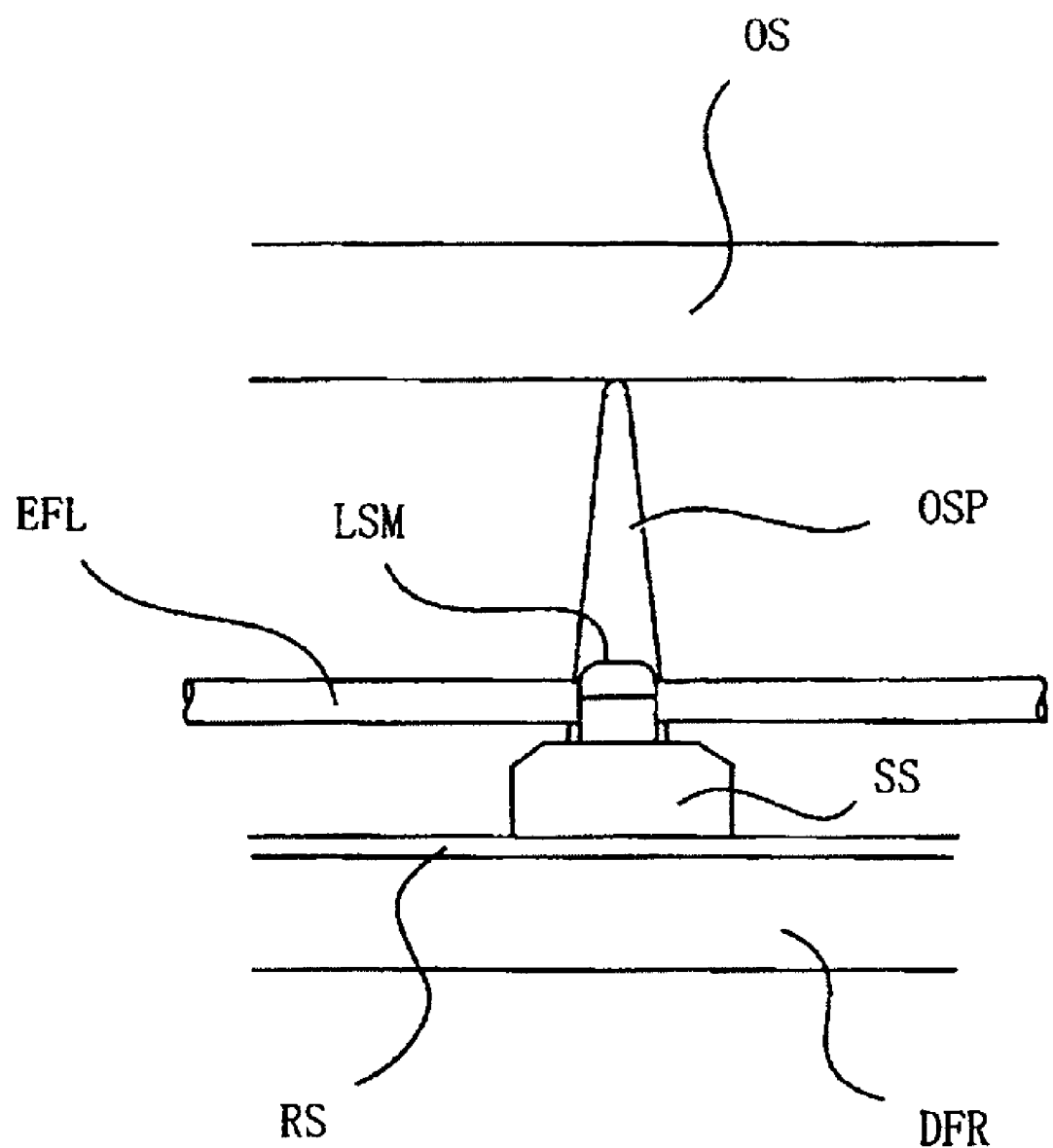
FIG. 5 is a side diagram showing a support for a fluorescent lamp used in the liquid crystal display device according to one embodiment of the present invention, and illustrates the function of the support pole for an optical sheet.

In addition, support poles for an optical sheet OSP are formed in the center portion of the supports for fluorescent lamps LSS used in this embodiment for supporting two external electrode fluorescent lamps EFL (see FIG. 1). The supports for fluorescent lamps LSS are formed so as to also function to support the optical sheet OS and, as shown in FIG. 5, the optical sheet OS can be supported by the above described support poles for an optical sheet OSP in such a manner that the optical sheet OS remains at a predetermined distance from the lower frame DFR. Here, FIG. 5 is a diagram showing a support for fluorescent lamps LSS as viewed from the side of the external electrode fluorescent lamps EFL.

The configuration of the external electrode fluorescent lamp LSS is described in further detail below in reference to FIGS. 1(a) to 1(c).

FIG. 4(b) is a diagram showing the state of the backlight BL shown in FIG. 4(a) with the above described side wall plates BWh removed.

The side wall plates BWh are made of a resin material, for example, cover the electrodes at the two ends of the above described external electrode fluorescent lamps EFL along the right side and the left side of the lower frame DFR in the direction y in the figure, and have such an inclination that the outer side is higher in the arrangement, as described above.

The side wall plates BWh are provided so as to overlap on the electrode supports TMT made of a resin, for example, and secured to the lower frame DFR, and secured by means of screws, not shown.

In addition, as shown in FIG. 4(b), when the side wall plates BWh are removed from the electrode supports TMT, a material for supporting the electrodes TMS provided on the surface of the electrode supports TFT is exposed.

The material for supporting electrodes TMS on the left in the figure is formed of an electrode fixture TMF for supporting and electrically connecting electrodes of the external electrode fluorescent lamps EFL aligned side-by-side on the left in the figure together, and in addition, the material for supporting electrodes TMS on the right in the figure is formed of an electrode fixture TMF for supporting and electrically connecting electrodes of the above described external electrode fluorescent lamps EFL on the right in the figure together, and these are formed through press processing, together with the electrode fixtures TMF.

<Material for Supporting Electrodes TMS>

Figure 6A:
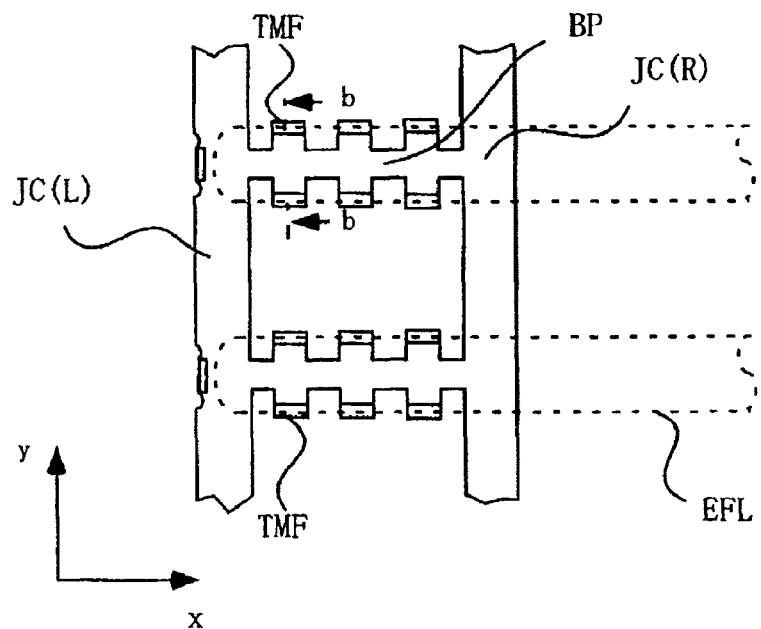
FIGS. 6(a) and 6(b) are diagrams showing the configuration of an electrode supporting material used in the liquid crystal display device according to one embodiment of the present invention.

FIG. 6(a) is a plan diagram showing a material for supporting electrodes TMS according to the above described embodiment, and shows an enlargement of the portion within the dotted frame Q in FIG. 4(b).

In FIG. 6(a), the material for supporting electrodes TMS1 has a base BP to which three electrode fixtures TMF are secured side-by-side, and a left side connection portion JC (L) and right side connection portion JC (R) which are connected to the respective ends of the base BP, and the base BP and the connection portions JC (L) and JC (R) are formed in a ladder pattern as viewed in a plane.

Figure 6B:
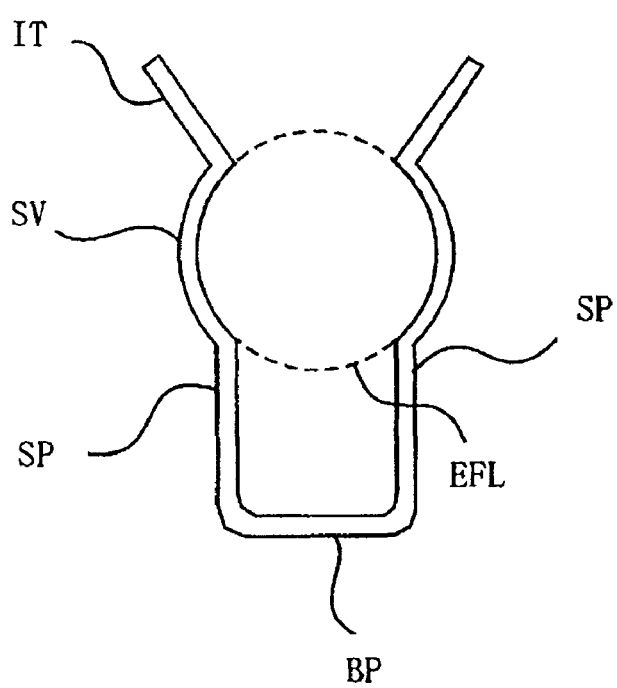

In addition, FIG. 6(b) is a cross sectional diagram along line b-b in FIG. 6(a) showing the above described electrode fixture TMF. The electrode fixture TMF has such a structure as to sandwich an electrode portion of an external electrode fluorescent lamp EFL from the two sides.

That is to say, a pair of support portions SP is gained by bending the base BT of the above described material for supporting electrodes TMS1 to a right angle at the two ends, and each of these support portions SP has a pressing portion SV which presses the electrode portion of the above described external electrode fluorescent lamp EFL from the side facing the surface around the electrode portion (shown by dotted circle in figure).

These pressing portions SV are in arc and concave on the side of the surface surrounding the electrode portion of the above described external electrode fluorescent lamp EFL (shown by dotted circle in figure).

In addition, the above described electrode fixtures TMF are formed of guide portions IT which are formed so as to spread in radius form from the end portion of the above described respective support portions SP. These guide portions IT are formed in order to make smooth guidance possible when an external electrode fluorescent lamp EFL is guided between the above described support portions SP.

(Support for Fluorescent Lamps LSS)

FIG. 1 is a diagram showing the configuration of the support for fluorescent lamps LSS according to one embodiment, and shows a support for fluorescent lamps LSS in the dotted circle S in FIG. 4(a), for example. The support for fluorescent lamps LSS shown in FIG. 1 is in such a state as not to be attached to the lower frame DFR.

Figure 1A:
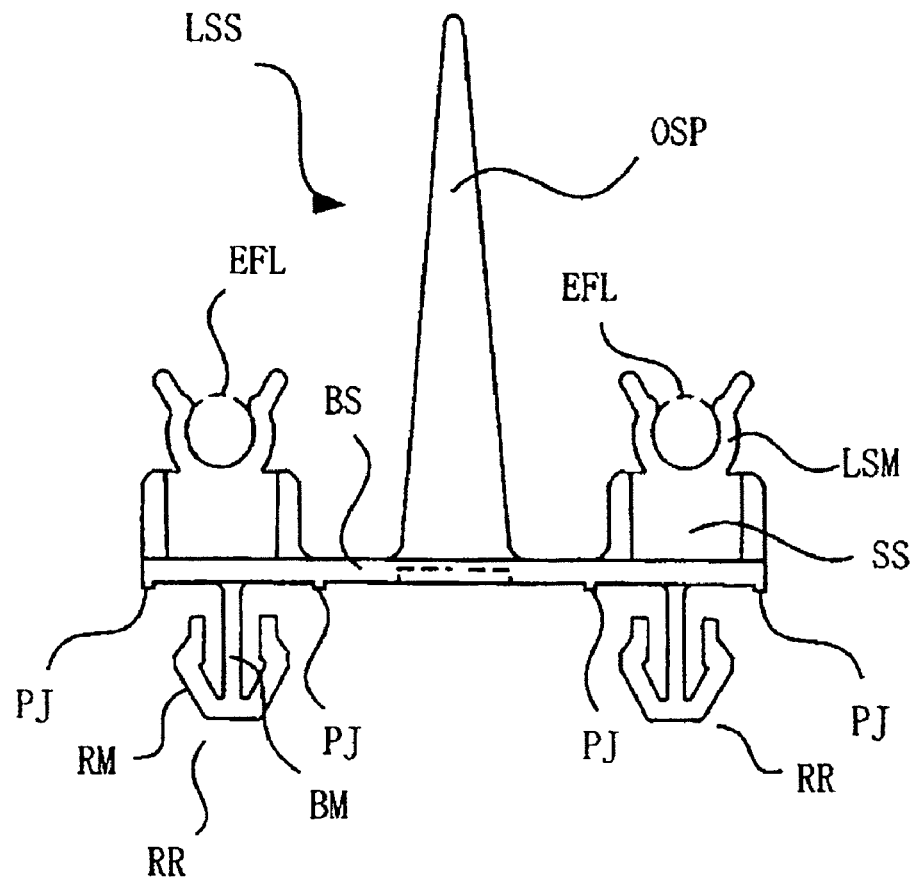
FIGS. 1(a) to 1(c) are diagrams showing the configuration of a support for a fluorescent lamp used in the liquid crystal display device according to one embodiment of the present invention.
Figure 1B:
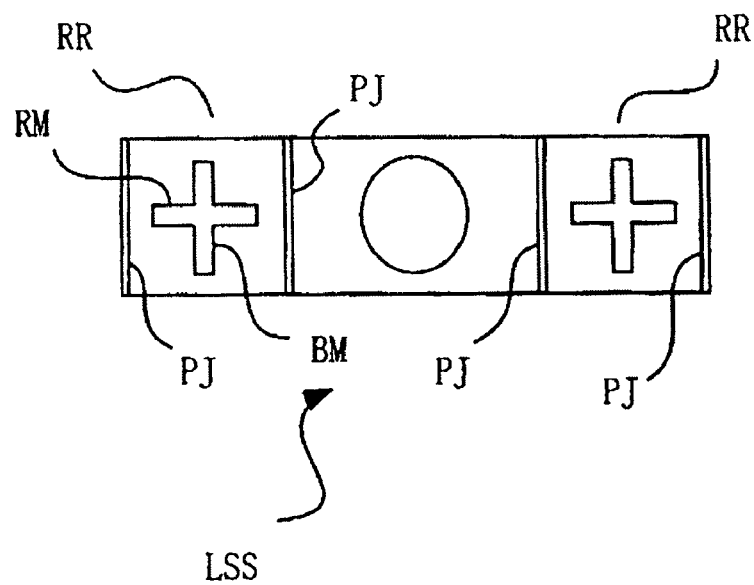
Figure 1C:
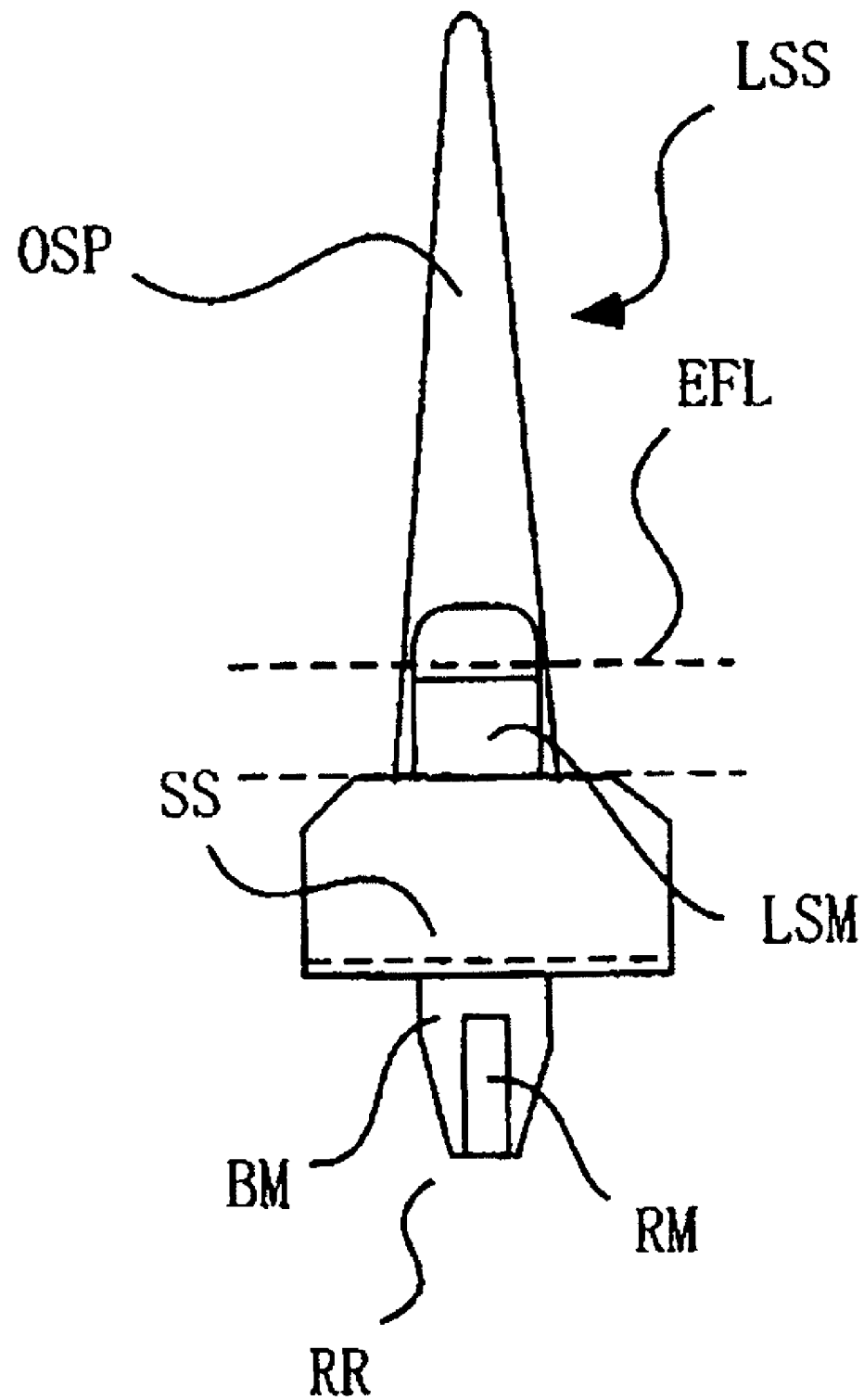

FIG. 1(a) is a side diagram showing the above described support for fluorescent lamps LSS in the direction of the long side, FIG. 1(b) is a bottom diagram showing the above described support for fluorescent lamps LSS, and FIG. 1(c) is a diagram showing the above described support for fluorescent lamps LSS as viewed from the side in the direction of the short side.

The support for fluorescent lamps LSS is formed as an integrated mold of a resin, for example. The support for fluorescent lamps LSS is provided with a substrate BS in plate form, and a support pole for an optical sheet OSP is formed at the center of the substrate BS, as described above, and a material for supporting fluorescent lamps LSM is formed on the two sides of the support pole for an optical sheet OSP.

The above described support pole for an optical sheet OSP is formed in conical form with large diameter on the substrate BS side and a smaller diameter toward the top.

The above described material for supporting fluorescent lamps LSM is made of a forked member which rises and extends from the upper surface of the base SS formed at a predetermined level relative to the surface of the above described substrate BS, and has lamp sandwiching portions for pressing the sides of the external electrode fluorescent lamp EFL and lamp insertion portions which spread outward from these lamp sandwiching portions so as to make insertion of the above described external electrode fluorescent lamp EFL easier.

An engaging portion RR for engaging with the above described lower frame DFR is formed on the rear surface of the above described substrate BS, as shown in FIG. 1(c). This engaging portion RR is made in pairs, and respectively formed directly behind the above described material for supporting fluorescent lamps LSM. The respective engaging portions RR are formed of an engaging material RM and extend from the top of the base BM secured to the above described substrate BS toward the rear surface of the base BM. The engaging material RM is formed so as to have elasticity.

In addition, protrusions PJ are formed on the two sides of the respective engaging portions RR on the surface of the substrate BS where the above described engaging portions RR are formed.

That is to say, as shown in FIG. 1(c), four protrusions PJ are formed so as to extend in a direction perpendicular to the direction of the long side of the substrate BS, and one engaging portion RR is placed between two protrusions PJ from among these, and the other engaging portion RR is placed between the other two protrusions PJ.

Figure 7:
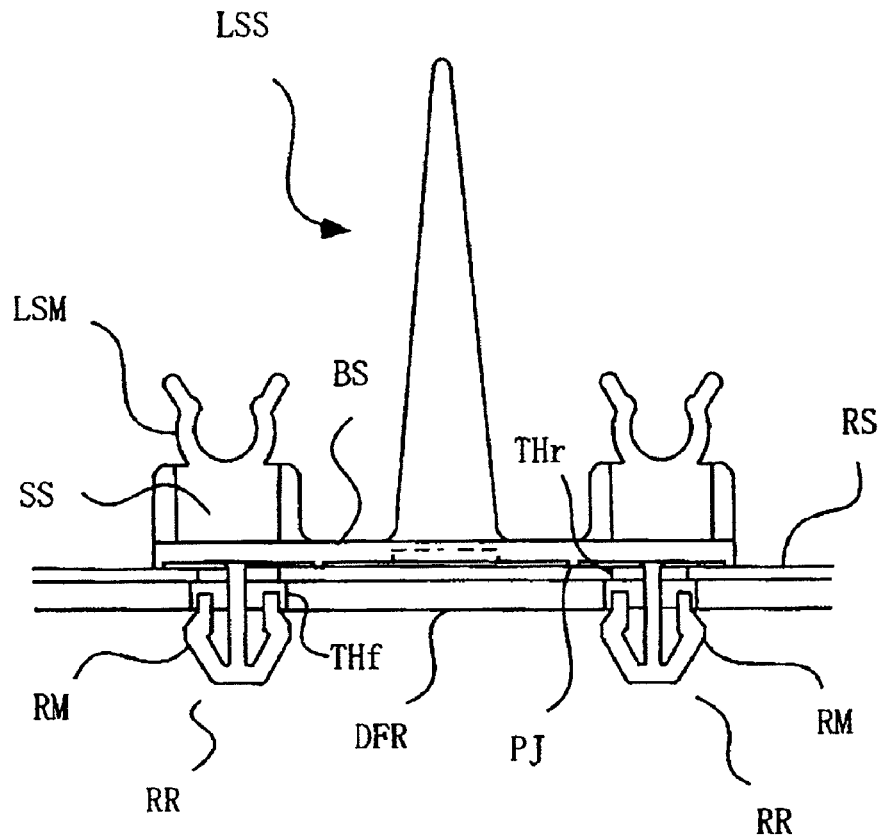
FIG. 7 is a diagram illustrating the effects of the supports for a fluorescent lamp used in the liquid crystal display device according to the present invention.

FIG. 7 is a diagram showing a case where the supports for fluorescent lamps LSS formed as described above are attached to the lower frame DFR.

In FIG. 7, a reflective sheet RS is mounted on the surface of the lower frame DFR on the side on which fluorescent lamps are mounted. A pair of holes THr and THf are created in the above described reflective sheet RS and lower frame DFR, and a pair of engaging portions RR on the above described support for fluorescent lamps LSS can be inserted into these holes THr and THf. The diameter of the holes THr and THf is smaller than the normal width of the engaging material RM.

In addition, the engaging material RM becomes a stopper after the engaging material RM of the above described engaging portion RR passes through the above described holes THr and THf and returns to its original form as a result of its elasticity, and the above described support for fluorescent lamps LSS is engaged with the lower frame DFR.

As described above, protrusions PJ are formed on the support for fluorescent lamps LSS in the present embodiment.

The base BM of the support for fluorescent lamps LSS is slightly long, in order to make assembly easier, and the distance between the substrate BS of the support for fluorescent lamps LSS and the engaging portion RM is greater than the total thickness of the lower frame DFR and the reflective sheet RS. Therefore, there is usually backlash in the up-down direction. In the present embodiment, however, the protrusions PJ can make the support for fluorescent lamps LSS make close contact with the lower frame DFR (to be precise, the reflective sheet RS).

Therefore, the above described support for fluorescent lamps LSS can prevent the lower frame DFR from causing backlash. As a result, in the case where the liquid crystal module according to the present embodiment is incorporated in a housing together with speakers in order to form a television receiver, noise can be prevented from being generated due to backlash between the engaging portion RR of the above described support for fluorescent lamps and the lower frame DFR when the speakers vibrate.

In addition, it is not necessary to design the above described support for fluorescent lamps LSS so that the clearance (space) between the substrate BS of the support for fluorescent lamps LSS and the engaging portion RM is smaller, and thus, sufficient ease of attachment of the support for fluorescent lamps LSS to the lower frame DFR can be secured.

Figure 8:
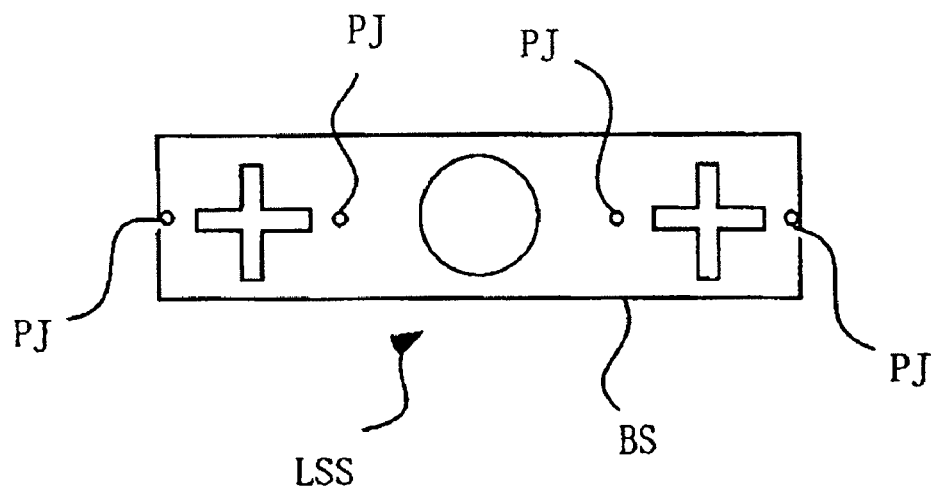
FIG. 8 is a diagram showing a support for a fluorescent lamp used in the liquid crystal display device according to another embodiment of the present invention.

Here, the protrusions PJ shown in FIG. 1(b) are in rod form. However, the protrusions PJ are not limited to these, and as shown in FIG. 8, protrusions in dotted or circular form may be provided, for example. Backlash can be prevented between the lower frame DFR and the support for fluorescent lamps LSS, irrespectively of the form of the protrusions PJ.

In addition, in the case where protrusions are formed in the other embodiments described below, as shown in FIG. 1(d), protrusions PJ in dotted or circular form may be provided in addition to protrusions PJ which extend in one direction. This is because protrusions PJ have similar effects in any form.

Second Embodiment

Figure 9A:
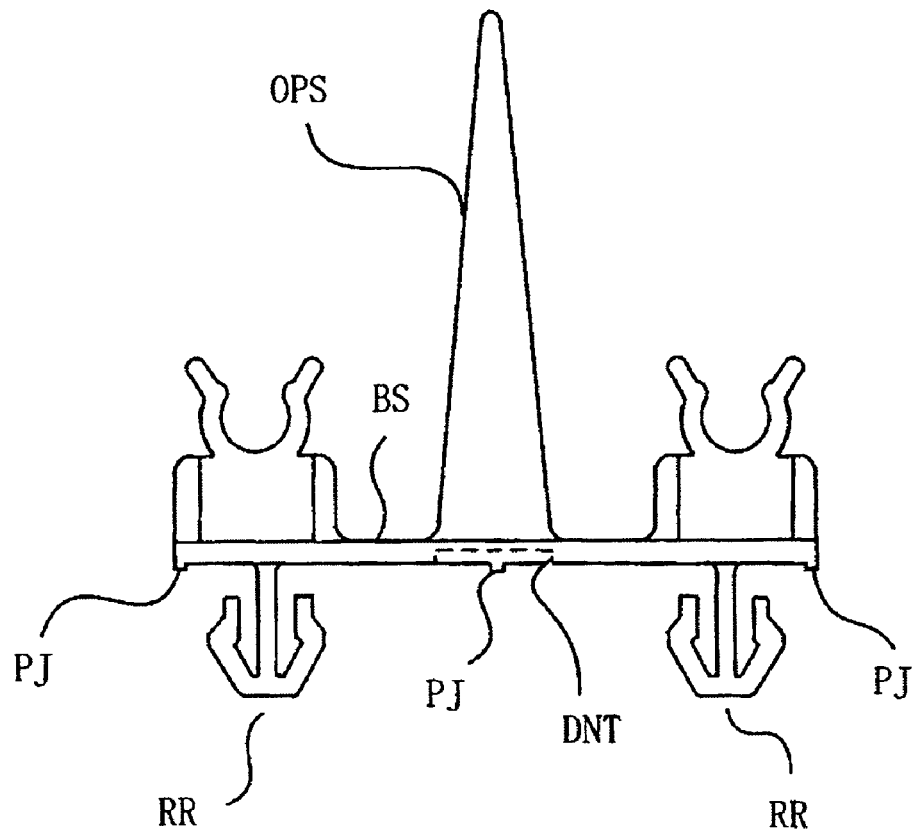
FIGS. 9(a) and 9(b) are diagrams showing a support for a fluorescent lamp used in the liquid crystal display device according to another embodiment of the present invention.
Figure 9B:
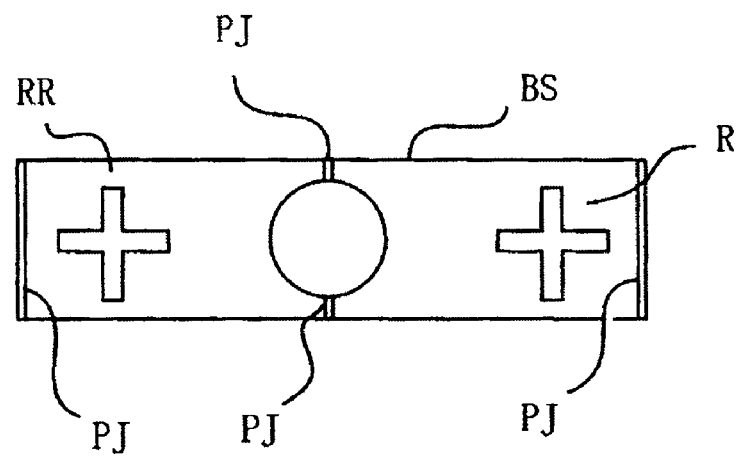

FIGS. 9(a) and 9(b) show the configuration of the present embodiment. In the present embodiment, three protrusions PJ are formed on a support for fluorescent lamps LSS where two engaging portions RR are formed on the rear surface of a substrate BS. FIG. 9(a) is a side diagram showing the support for fluorescent lamps LSS in the direction of the long side, and FIG. 9(b) is a bottom diagram showing the support for fluorescent lamps LSS.

As shown in FIGS. 9(a) and 9(b), the present embodiment has such a form that a pair of protrusions PJ are formed on both sides of one engaging portion RR and a pair of protrusions PJ are formed on both sides of the other engaging portion RR, and one protrusion PJ is formed between the two engaging portions RR, and therefore, the number of protrusions PJ is three.

Therefore, one protrusion out of the three protrusions PJ is formed at approximately the center of the substrate BS. Here, in the present embodiment, a recess DNT in circular form is created at the center of the substrate BS. This recess DNT is created when an optical sheet support pole OSP is formed at the center of the substrate BS, and the above described protrusion PJ at the center of the substrate BS is formed in a pattern which is divided by the above described recess DNT.

As described above, even in the case where the protrusion PJ is located at the center of the support for the fluorescent lamps LSS, it becomes possible to prevent backlash.

Third Embodiment

Figure 10A:
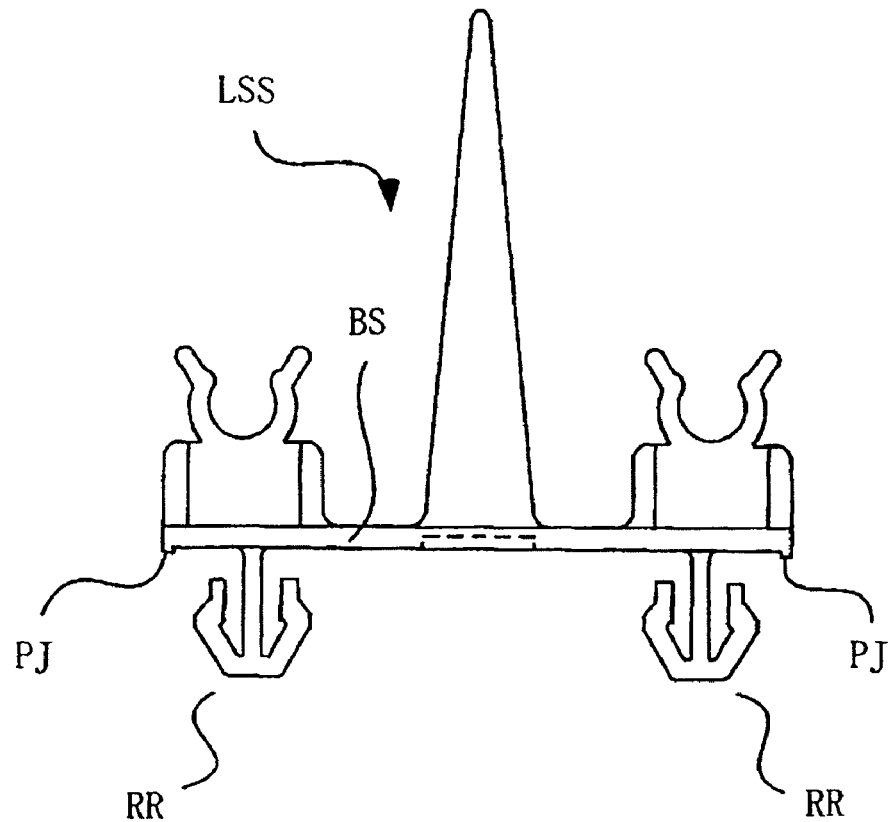
FIGS. 10(a) and 10(b) are diagrams showing a support for a fluorescent lamp used in the liquid crystal display device according to another embodiment of the present invention.
Figure 10B:
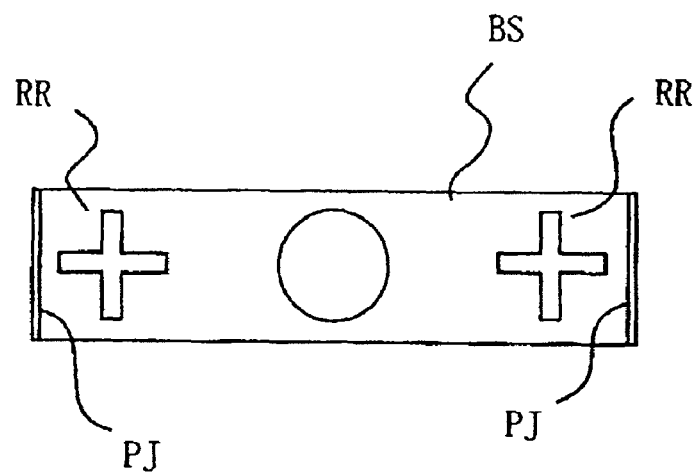

FIGS. 10(a) and 10(b) show the configuration of the present embodiment. The present embodiment has a configuration where two engaging portions RR are formed on the rear surface of the substrate BS, and two protrusions PJ are provided outside each engaging portion RR in the support for fluorescent lamps LSS.

In the case of this configuration, it becomes possible to prevent backlash in the support for fluorescent lamps LSS.

Fourth Embodiment

Figure 11A:
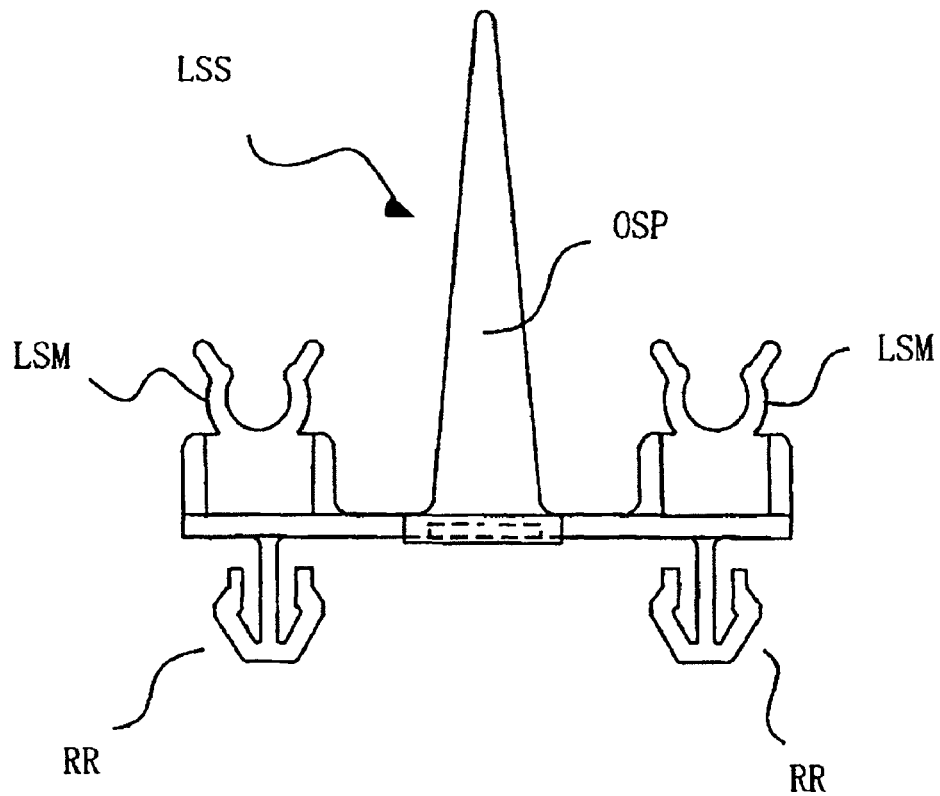
FIGS. 11(a) and 11(b) are diagrams showing a support for a fluorescent lamp used in the liquid crystal display device according to another embodiment of the present invention.
Figure 11B:
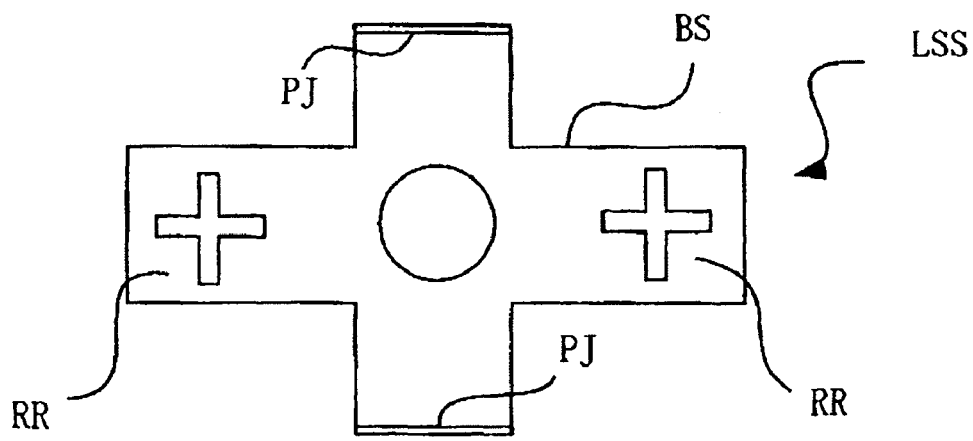

FIGS. 11(a) and 11(b) show the configuration of the present embodiment.

The substrate BS of the support for fluorescent lamps LSS in each of the above described embodiments is rectangular. In contrast, in the present embodiment, as shown in FIGS. 11(a) and 11(b), the substrate BS is in cross form where the above described rectangular member is formed integrally with another rectangular member which crosses the above described rectangular member.

Furthermore, as shown in FIGS. 11(a) and 11(b), one rectangular member has a configuration where a pair of engaging portions RR are formed and no protrusions PJ are formed, while protrusions PJ are formed in the two end portions of the other rectangular member, respectively, and no engaging portions RR are formed.

In the case of this configuration, the other rectangular member increases the stability of the substrate BS in the direction of the short side. In addition, protrusions PJ are formed in the other rectangular member, and thus, backlash in the up-down direction can be prevented.

Here, the protrusions PJ may be formed outside the engaging portions RR in the same manner as in the third embodiment. In addition, protrusions PJ may be formed both outside the engaging portions RR and on the other rectangular member. In either case, it becomes possible to prevent backlash in the up-down direction of the support for fluorescent lamps LSS and to increase the stability of the substrate BS in the direction of the short side.

Fifth Embodiment

Figure 12A:
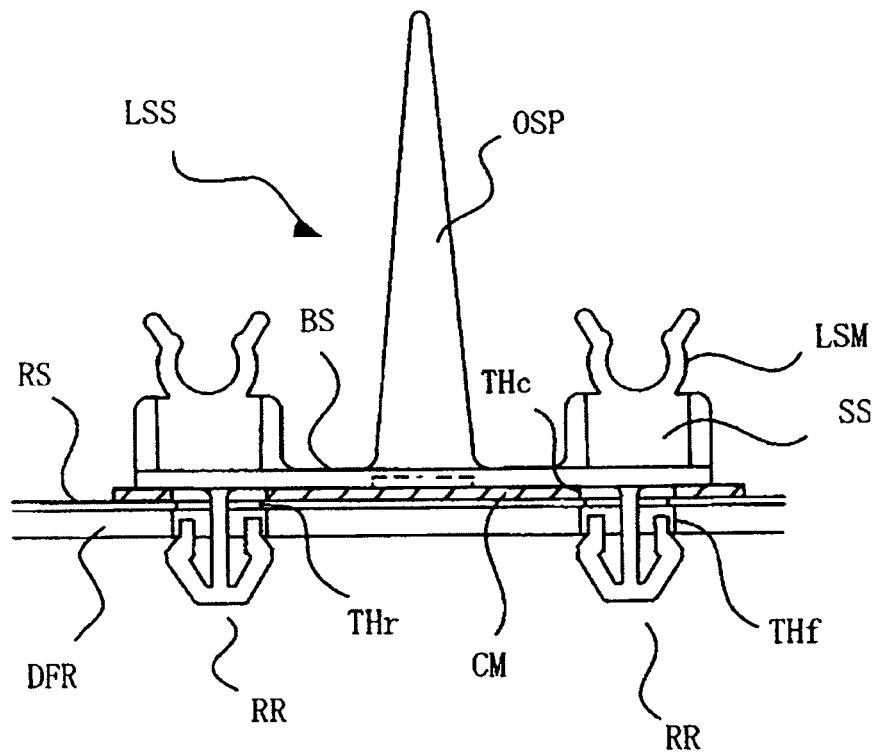
FIGS. 12(a) and 12(b) are diagrams showing a support for a fluorescent lamp used in the liquid crystal display device according to another embodiment of the present invention.
Figure 12B:
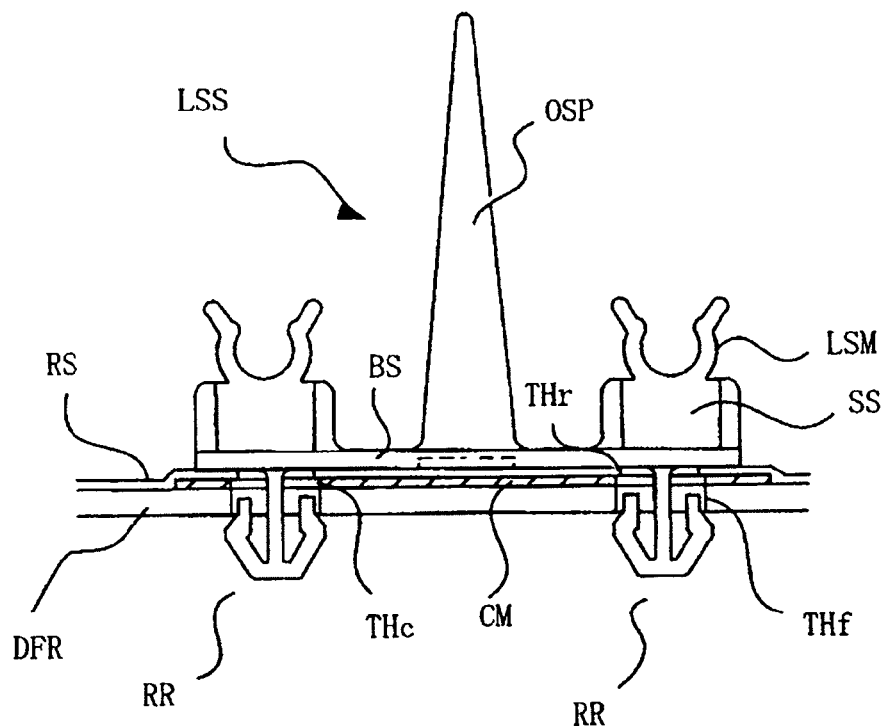

FIGS. 12(a) and 12(b) show the configuration of the present embodiment.

FIG. 12(a) is a diagram showing the configuration of the main portion in the present embodiment and corresponds to FIG. 7. The support for fluorescent lamps LSS shown in FIG. 12(a) has a configuration where no protrusions PJ as shown in the above described embodiments are formed on the surface on the side facing the lower frame DFR (rear surface of the substrate).

In addition, a cushioning material CM made of a resin material sheet, for example, intervenes between the above described support for fluorescent lamps LSS and the reflective sheet RS mounted on the above described lower frame DFR.

This cushioning material CM is formed so as to have approximately the same form and area as the substrate BS of the support for fluorescent lamps LSS, and thus, formed so as to have holes THc aligned on the same axis as the above described holes THf of the lower frame DFR.

The respective engaging portions RR of the support for fluorescent lamps LSS pass through the holes THc of the cushioning material CM when the support for fluorescent lamps LSS is attached to the lower frame DFR. As a result, the above described cushioning material CM can be provided between the support for fluorescent lamps LSS and the reflective sheet RS without shifting positions in the horizontal direction after the support for fluorescent lamps LSS is attached to the lower frame DFR.

In the case of this configuration, force is applied to the support for fluorescent lamps LSS and the lower frame DFR in such a direction that they move away from each other due to the elasticity of the above described cushioning material CM, and thus, backlash can be prevented from occurring in the lower frame DFR of the support for fluorescent lamps LSS. Therefore, in the case where the liquid crystal module in the present embodiment is incorporated into the housing together with speakers so that a television receiver is formed, noise can be prevented from being caused by the backlash between the engaging portions RR of the above described support for fluorescent lamps LSS and the lower frame DFR when the speakers vibrate.

Here, in the configuration shown in FIG. 12(a), the cushioning material CM intervenes between the support for fluorescent lamps LSS and the reflective sheet RS. As shown in FIG. 12(b) however, the cushioning material may intervene between the reflective sheet RS and the lower frame DFR. This is because the cushioning material CM has the same effects as in the case of FIG. 12(a).

In addition, in the embodiment shown in FIGS. 12(a) and 12(b), one cushioning material CM intervenes between the support for fluorescent lamps LSS and the lower frame DFR. However, two separate cushioning materials, one in the vicinity of one engaging portion RR and the other in the vicinity of the other engaging portion RR, may be provided instead of one cushioning material CM.

In addition, in the embodiment shown in FIGS. 12(a) and 12(b), the support for fluorescent lamps LSS has a configuration where no protrusions PJ as shown in the above described embodiments are formed on the surface on the side facing the lower frame DFR. However, the configuration may have protrusions PJ formed in the same manner as in the above described embodiment.

Sixth Embodiment

Figure 13:
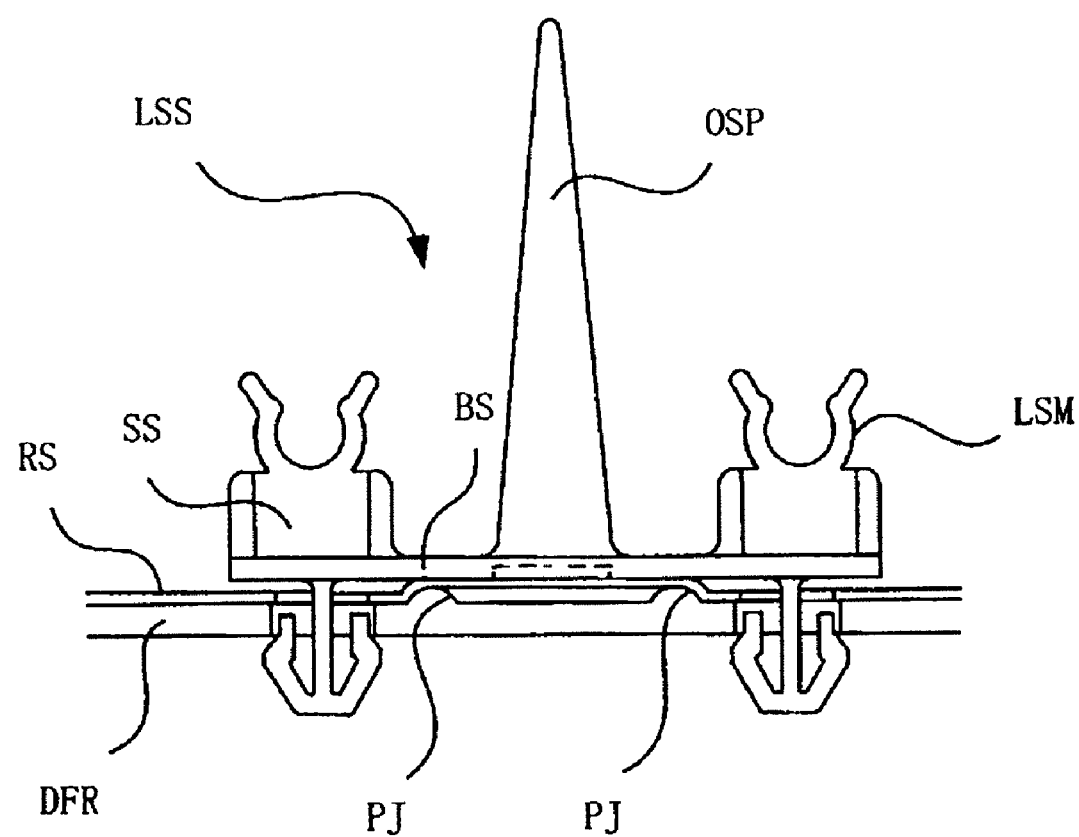
FIG. 13 is a diagram showing a support for a fluorescent lamp used in the liquid crystal display device according to another embodiment of the present invention.

FIG. 13 shows the configuration of the present embodiment. FIG. 13 corresponds to FIG. 7.

The support for fluorescent lamps LSS shown in FIG. 13 has a configuration where no protrusions PJ as shown in the above described embodiments are not formed on the surface on the side facing the lower frame DFR (rear surface of the substrate BS), for example. Instead, protrusions PJ are formed on the surface of the lower frame DFR facing the above described support for fluorescent lamps LSS.

In the embodiment shown in FIG. 13, two protrusions PJ in total are provided between a pair of engaging portions RR when the support for fluorescent lamps LSS is attached to the lower frame DFR.

The above described protrusions PJ formed on the lower frame DFR function in the same manner as the protrusions PJ formed on the support for fluorescent lamps LSS shown in the first embodiment and prevent backlash from occurring in the lower frame DFR of the support for fluorescent lamps LSS. Therefore, in the case where the liquid crystal module in the present embodiment is incorporated into the housing together with speakers so that a television receiver is formed, noise can be prevented from being caused by the backlash between the engaging portions RR of the above described support for fluorescent lamps LSS and the lower frame DFR when the speakers vibrate.

Here, the above described protrusions PJ formed on the lower frame DFR are not limited to the locations shown in FIG. 13, and protrusions may be formed in locations on the surface of the lower frame DFR facing the respective protrusions PJ on the support for fluorescent lamps LSS shown in FIGS. 1(*a*) to 1(*c*), 7, and 9(*a*) to 10(*b*).

In addition, though in the embodiment shown in FIG. 13 the support for fluorescent lamps LSS has a configuration where no protrusions PJ are formed, the configuration may have protrusions PJ formed on the support for fluorescent lamps LSS in the same manner as in the above described embodiments.

In the description of the present embodiment, a reflective sheet RS is mounted on the surface of the lower frame DFR on which external electrode fluorescent lamps EFL are mounted in the configuration. However, in the case where the surface of the lower frame DFR on which external electrode fluorescent lamps EFL are mounted is processed so as to have reflecting functions, the above described reflective sheet RS is not always necessary.

In addition, it can be seen from this specification that the structure where the above described lower frame DFR and the reflective sheet RS are combined is a frame of the backlight BL.

The above described embodiments show that an optical sheet support pole OPS is planted at the center of the substrate BS of the above described support for fluorescent lamps LSS. However, the invention is not limited to this configuration, and the above described optical sheet support pole OPS needs not to be formed.

In addition, an example is shown where the above described support for fluorescent lamps LSS is formed so that two external electrode fluorescent lamps EFL aligned side by side can be supported. However, the invention is not limited to this configuration, and the invention can be applied to the configuration where three or more external electrode fluorescent lamps EFL can be supported or only one external electrode fluorescent lamp EFL can be supported.

The above described embodiments may be used solely or may be combined for use. This is because the effects of the respective embodiments can be solely gained or in conjunction with each other.

The invention claimed is:

1. A liquid crystal display device, comprising:
a liquid crystal display panel; and
a backlight having a light source for illuminating the liquid crystal display panel,
wherein said backlight comprises at least a number of fluorescent lamps in rod form aligned in a plane facing said liquid crystal display panel, supports for fluorescent lamps for supporting the fluorescent lamps in rod form, and a frame to which said supports for fluorescent lamps are secured,
wherein said supports for fluorescent lamps have an engaging portion for insertion into a hole created in said frame and a surface of said supports for fluorescent lamps where said engaging portion is formed has protrusions, and
wherein said supports for fluorescent lamps have bumps sticking out in a direction perpendicular to a long side of said supports for fluorescent lamps, the bumps has a plane of a same level same as said supports, and said protrusions are formed on said bumps.

2. The liquid crystal display device according to claim 1, wherein a reflective sheet is placed between said supports for fluorescent lamps and said frame.

3. The liquid crystal display device according to claim 1, wherein said protrusions are in rod form and parallel to a short side of said supports for fluorescent lamps, and formed on both sides of said engaging portion.

4. The liquid crystal display device according to claim 1, wherein said protrusions are in rod form and parallel to a short side of said supports for fluorescent lamps, and formed on both sides of the short side of said supports for fluorescent lamps.

5. The liquid crystal display device according to claim 1, wherein said protrusions are in circular form, and a number of protrusions are formed per support for fluorescent lamp.

6. A liquid crystal display device, comprising:
a liquid crystal display panel; and
a backlight having a light source for illuminating the liquid crystal display panel,
wherein said backlight comprises at least a number of fluorescent lamps in rod form aligned in a plane facing said liquid crystal display panel, supports for fluorescent lamps for supporting the fluorescent lamps in rod form, and a frame to which said supports for fluorescent lamps are secured,
wherein said supports for fluorescent lamps have an engaging portion for insertion into a hole created in said frame, and
wherein a cushioning material intervenes between said supports for fluorescent lamps and said frame, said cushioning material having a shape substantially the same as said supports for fluorescent lamps.

7. The liquid crystal display device according to claim 6, wherein said cushioning material is formed so as to have a hole corresponding to the portion where said hole is created in said frame.

8. The liquid crystal display device according to claim 6, wherein a reflective sheet is placed between said supports for fluorescent lamps and said frame, and said cushioning material is placed between said supports for fluorescent lamps and said reflective sheet or between said reflective sheet and said frame.

* * * * *